United States Patent [19]
Morokoshi

[11] 3,844,387
[45] Oct. 29, 1974

[54] BRAKING DEVICE FOR A DRIVEN SHAFT
[75] Inventor: Hiroshi Morokoshi, Osaka, Japan
[73] Assignee: Yamaai Seisakusho Co., Ltd., Shimizu-cho, Sakai, Japan
[22] Filed: Mar. 19, 1973
[21] Appl. No.: 342,620

[52] U.S. Cl. ............................. 188/187, 192/105 B
[51] Int. Cl. ............................................ B60t 7/12
[58] Field of Search ............... 188/70 R, 85, 82–84, 188/187; 192/8 R, 103 A, 103 C, 105 A, 105 B, 105 BB

[56] References Cited
UNITED STATES PATENTS

| | | | |
|---|---|---|---|
| 1,720,766 | 7/1929 | Spahr | 192/105 B |
| 2,375,639 | 5/1945 | Falk | 188/187 |
| 2,491,003 | 12/1949 | Elmore | 188/187 X |
| 2,827,136 | 3/1958 | Sorchy | 188/187 X |

FOREIGN PATENTS OR APPLICATIONS

| | | | |
|---|---|---|---|
| 709,200 | 5/1931 | France | 188/187 |

*Primary Examiner*—Duane A. Reger
*Attorney, Agent, or Firm*—Morgan, Finnegan, Durham & Pine

[57] ABSTRACT

A braking device for a driven shaft includes a rotatable disc fixed to a driven shaft, a brake disc journaled concentrically with and adjacent said rotatable disc so as to be movable both in the axial direction and around the axis, and a brake block fixed in position adjacent said rotatable disc and around the outer periphery of said brake disc. The brake disc is constantly urged by a spring into engagement with the rotatable disc, and also with the brake block so that the free rotation of the brake disc around the axis is restrained, thereby imparting a braking force to the driven shaft. The device is provided with means including balls installed between the rotatable disc and the brake disc for the intermittent disengagement between the brake disc and the brake block against the force of the spring.

3 Claims, 5 Drawing Figures

PATENTED OCT 29 1974　　　　　　　　　　　　　　　3,844,387

BRAKING DEVICE FOR A DRIVEN SHAFT

BACKGROUND OF THE INVENTION

The present invention relates to a braking device adapted to apply brakes on a driven shaft such as the driven shaft for the winding drum in an electrical hoist in such a manner that the tendency of said shaft to overspeed during the rotation is suppressed but that upon interruption of power supply to said shaft the rotation thereof is immediately stopped.

The prior art braking device of this type is constructed of a combination of mechanical and electromagnetic brakes in view of the necessity of securing safety in operation. However, there are problems about such construction in that it is complicated and cannot be reduced in size and weight and that it entails high cost.

An object of the invention is to provide a braking device of the type referred to above which is simple in construction and inexpensive.

Another object of the present invention is to provide a braking device of the type referred to above which is adapted to suppress the tendency of a driven shaft to overspeed during the rotation by intermittent application of a braking force to said shaft.

SUMMARY OF THE INVENTION

According to the present invention, the objects described above are accomplished by providing a braking device for a driven shaft comprising a rotatable disc fixed to a driven shaft, a brake disc journaled concentrically with and adjacent said rotatable disc, said brake disc being movable both in the axial direction and around the axis, a brake block fixed in position adjacent said rotatable disc and around the outer periphery of said brake disc and engageable with the outer periphery of said brake disc to suppress the free rotation of said brake disc around the axis, spring means urging the brake disc into engagement with the brake block and also with the rotatable disc, and means installed between said rotatable disc and brake disc for the intermittent disengagement between the brake disc and the brake block against the force of said spring.

In a preferred embodiment of the invention, the means for the intermittent disengagement between the brake disc and the brake block comprises a plurality of recess formed in the rotatable disc around the circumferential edge thereof on the side opposed to the brake disc, the depth of said recess being gradually decreased in a direction opposite to the direction of rotation of the rotatable disc, an inclined surface formed on the brake disc on the side opposed to the rotatable disc, said inclined surface being directed toward the recesses in the rotatable disc obliquely from above, and a plurality of balls received in spaces each defined between such recess in the rotatable disc and the inclined surface of the brake disc.

In another preferred embodiment of the invention, said means for the intermittent disengagement between the brake disc and brake block comprises a plurality of recesses formed at radially opposed positions in the opposed surfaces of the rotatable disc and brake disc, the depth of said recesses being gradually decreased in a direction opposite to the direction of rotation of the rotatable disc, and a plurality of balls received in spaces each defined by a pair of such opposed mating recesses.

The spring acting on the brake disc is preferably arranged so that its elastic energy can be adjusted as desired. Further, the respective engageable surfaces of the brake disc and the brake block are cone-shaped tapering toward the rotatable shaft.

The invention will now be described in more detail with reference to the accompanying drawings illustrating embodiments of the braking device according to the invention.

DETAILED DESCRIPTION OF THE EMBODIMENTS

Figure 1:
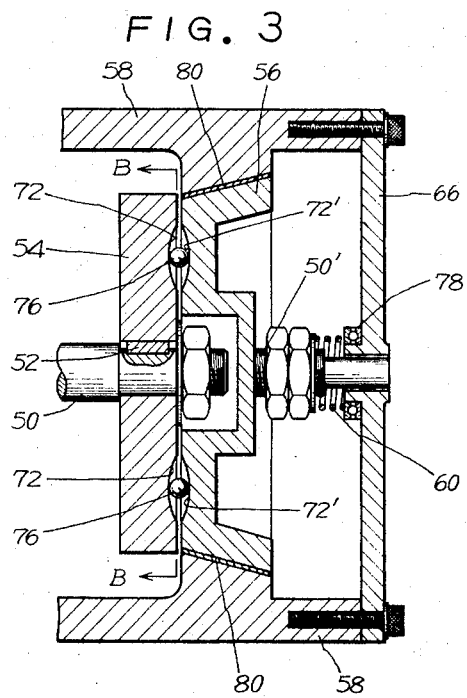
FIG. 1 is a longitudinal sectional view of the principal portion of a first embodiment of the braking device according to the invention.
Figure 2:
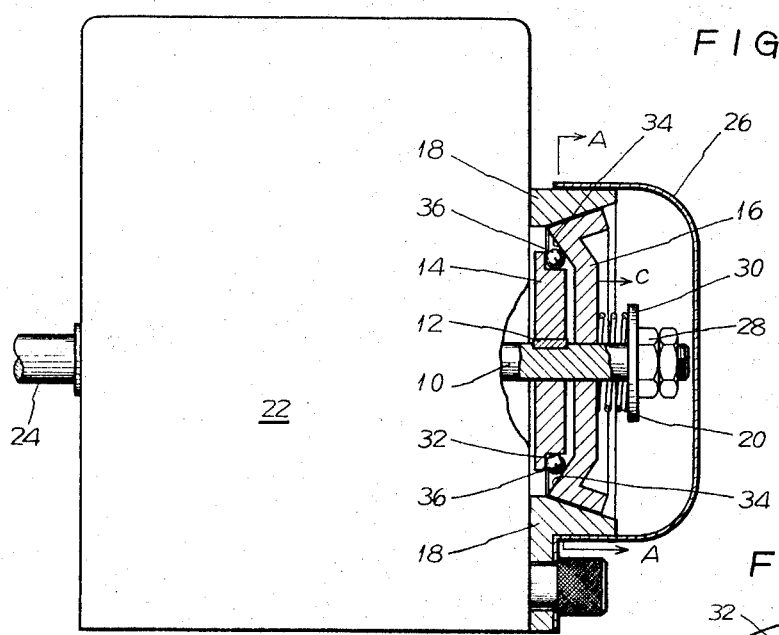
FIG. 2 is a sectional view taken along the line A—A of FIG. 1.

First, referring to FIGS. 1 and 2, the braking device in a first embodiment of the invention is shown as enclosed in a cover 26. As basic components, it comprises a rotatable disc 14 fixed through a key 12 to a driven shaft 10 to be braked, a brake disc 16 supported adjacent the rotatable disc 14 so as to be movable both in the axial direction and around the axis with respect to the driven shaft 10, a brake block 18 installed adjacent the rotatable disc 14 around the outer periphery of the brake disc 16 and fixed to the casing 22 of an electric motor, transmission or the like, said brake block being engageable with the outer periphery of the brake disc 16, and a coiled spring 20 mounted on the driven shaft 10 adjacent the brake disc 16 and urging the brake disc 16 toward the rotatable disc 14 into engagement with the latter and also with the brake block 18.

The driven shaft 10 to be braked is shown as rotatable supported by the casing 22, the arrangement being such that the torque therefrom is derived through a shaft 24 after suitable change in speed is effected by gear means, not shown, installed within the casing 22.

As shown, the end of the coiled spring 20 urging the brake disc 16 toward the rotatable disc 14 which is not engaged with the brake disc 16 is associated with a nut 28 mounted on the driven shaft 10 through a washer 30. Thus, the elastic energy (or active force on the brake force) in the coiled spring 20 can be suitably adjusted by turning the nut 28 so as to obtain an action to be later described.

The brake disc 16 is formed with a cone-shaped surface around the outer periphery thereof tapering toward the rotatable disc 14, and the brake block is also formed with a cone-shaped surface adapted to cooperate with said cone-shaped surface of the brake disc 16. Thus, these two members are engageable with each other through these cone-shaped surfaces.

As a further basic component, the device in the first embodiment includes means installed between the rotatable disc 14 and brake disc 16 for the intermittent disengagement between the brake disc 16 and the brake block 18, said means comprising recesses 32 (see FIG. 2) spaced apart 90° from each other and formed in the circumferential edge of the rotatable disc 14 on the side opposed to the brake disc 16, the depth of said recesses being gradually decreased in a circumferential direction opposite to the direction of rotation indicated by an arrow a (recesses shown in FIG. 2 having the depth gradually decreased also in the direction of rotation for the reason of manufacture), and balls 36 received in spaces each defined between such recess 32 in the rotatable disc 14 and the inclined surface 34 of the brake disc 16 in such a manner that the balls engage these two discs.

The device in the first embodiment is constructed in the manner described so far and operates in the following manner.

Generally, as shown in FIGS. 1 and 2, the action of the coiled spring 20 causes the cone-shaped surface of the brake disc 16 to engage the mating cone-shaped surface of the brake block 18 to restrain the free rotation of the brake disc 16, such rotation restraining force on the brake disc being transmitted from the inclined surface 34 to the rotatable disc 14 through the balls 36 positioned in the deepest regions of the recesses 32, thereby applying brakes on the driven shaft 10. In this device, however, as the driven shaft 10 and rotatable disc 14 continue to rotate from the position shown in FIGS. 1 and 2 in the direction of arrow a, said braked condition is instantly cancelled and replaced by a non-braked condition at the next moment. That is, as the rotation of the rotatable disc 14 in the direction of arrow a continues from the position shown In FIGS. 1 and 2, the difference in rotative speed between the rotatable disc 14 and the brake disc 16 increases since the brake disc 16 behaves as if fixed in position by the brake block 18. Therefore, the balls 36 positioned in the deepest regions of the recesses 32 are subjected to a force acting thereon in a direction of arrow b (FIG. 2) substantially opposite to the direction of rotation of the rotatable disc 14 and are thereby moved to the shallower regions of the recesses 32. As a result, the brake disc 16 is moved in the direction of arrow c (FIG. 1) while compressing the coiled spring 20, thereby disengaging with the brake block 18, whereby the driven shaft 10 is freely rotated as driven and is now in a position to overspeed.

In this device, however, such unbraked condition is replaced by a braked condition at the next moment. That is, the brake disc 16, when thus brought into the unbraked condition, is dragged by the rotatable disc 14 to gain rotative speed until the difference in rotative speed between it and the rotatable disc 14 is eliminated, so that the force effective to move the balls toward the shallower regions of the recesses 32 is decreased until it is exceeded by the active force of the compressed coiled spring 20. Thus the balls 36 return to the deepest regions of the recesses 32 by the force of the spring 20 and the driven shaft 10 again is brought into an unbraked condition.

Thus, by repetative alternation of such braking and unbraking conditions, that is, by the action of intermittent braking forces, the tendency of the driven shaft to overspeed is suppressed as much as possible.

In addition, it will be readily understood from the foregoing description that in this device if the torque acting on the driven shaft is interrupted, the driven shaft is immediately stopped.

Figure 5:
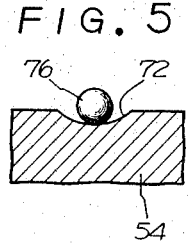
FIG. 5 is a sectional view taken along the line C—C of FIG. 4.
Figure 3:
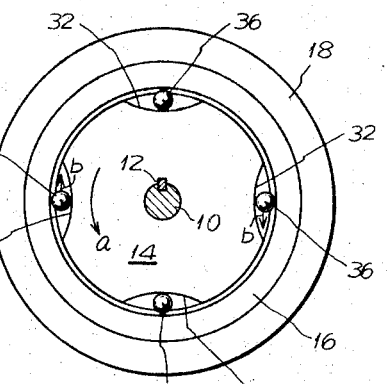
FIG. 3 is a longitudinal sectional view of the principal portion of a second embodiment of the braking device according to the invention.
Figure 4:
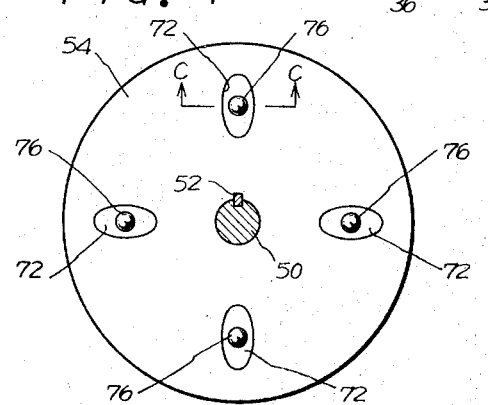
FIG. 4 is a sectional view taken along the line B—B of FIG. 3.

Referring to FIGS. 3 to 5 in which each of the members corresponding the members in the first embodiment has the sign number added 40 to the sign number of the corresponding member in the first embodiment, the device in a second embodiment shown therein is greatly different from the preceding embodiment in two points; firstly the arrangement for supporting the brake disc, and secondly the means for the intermittent disengagement between the brake disc and the brake block. Thus, in this embodiment, a brake disc 56 is fixed to a support shaft 50' attached to a side plate 66 forming the cover in such a manner that said brake disc 56 is concentric with the driven shaft 50 and movable around its own axis and also in the axial direction. Further, the means for the intermittent disengagement between the brake disc 56 and brake block 58 comprises a plurality of recesses 72, 72' formed at radially opposed positions in the opposed surfaces of the rotatable disc 54 and the brake disc 56, the depth of said recesses being gradually decreased in a direction opposite to the direction of rotation of the rotatable disc 54 (for the reason of manufacture, recesses shown in FIGS. 3 to 5 having the depth gradually decreased also in the direction of rotation and in the radial direction), and a plurality of balls 76 received in spaces each defined between a pair of such opposed mating recesses. Further, in this second embodiment, a coiled spring 60 urging the brake disc 56 toward the rotatable disc 54 and brake block 58 is interposed between a nut 68 mounted on the support shaft 50' and a thrust bearing 78 attached to the side plate 66, so that the elastic energy in the coiled spring can be suitably adjusted. The cone-shaped surface of the brake disc 56 is also provided with a lining 80.

In this second embodiment also, as in the case of the first embodiment, in the braked condition shown in FIG. 3 the rotation of the driven shaft 50 and hence the rotatable disc 54 causes the balls 76 in their corresponding recesses 72, 72' to move toward the shallower regions of the recesses, so that the brake disc 56 is pushed away from the brake block 58 against the force of the coiled spring 60, thereby removing brakes on the driven shaft, whereupon the brake disc 56 thus pushed away from the brake block 58 is then pushed back by the coiled spring 60 to apply brakes on the driven shaft 50 such actions being repeatedly carried out to suppress the tendency of the driven shaft 50 to overspeed during the rotation. Further, when the input torque to the driven shaft 50 is interrupted, said driven shaft 50 is immediately stopped.

As is apparent from the above description of the embodiments, the present invention provides a braking device for a driven shaft which is very simple in construction annd inexpensive.

What is claimed is:

1. A braking device for a driven shaft comprising: a rotatable disc fixed to said driven shaft to rotate therewith; a brake disc journalled concentrically with and adjacent said rotatable disc so as to be movable both in the axial direction and about its axis, said brake disc having a cone-shaped outer surface tapering toward said rotatable disc; a brake block fixed in position adjacent said rotatable disc and around the outer periphery of said brake disc concentrically with said brake disc, said brake block having a cone-shaped inner surface tapering toward said rotatable disc, said inner surface of said brake block being engageable with said cone-shaped outer surface of said brake disc to restrain the free rotation of said brake disc about the axis when said brake disc engages with said rotatable disc; spring means mounted adjacent said brake disc for urging said brake disc into engagement with said rotatable disc and also with said brake block; and means located between said rotatable disc and brake disc for intermittent disengagement between said brake disc and said brake block against the force of said spring means, said means comprising a plurality of balls, and a plurality of spaces formed between opposed surfaces of said rotatable disc and said brake disc at regular intervals in the circumferential direction of said two discs for receiving said balls under the condition which said balls always engage with both discs, each of said ball receiving spaces having the depth gradually decreasing in a direction opposite to the direction of rotation of said rotatable disc.

2. A braking device as set forth in claim 1, wherein each of said ball receiving spaces comprises a recess formed in the circumferential edge of said rotatable disc on the side opposed to said brake disc, the depth of said recess being gradually decreased in a direction opposite to the direction of rotation of said rotatable disc, and an inclined surface formed at radial position of said brake disc corresponding to said recess of said rotatable disc, said inclined surface tapering in the direction remote from said rotatable disc.

3. A braking device as set forth in claim 1, wherein each of said ball receiving spaces comprises a pair of recesses formed at radially opposed positions in the opposed surfaces of said rotatable disc and said brake disc, the depth of said recesses being gradually decreased in a direction opposite to the direction of rotation of said rotatable disc.

* * * * *